United States Patent
Lepage et al.

(10) Patent No.: US 7,156,333 B2
(45) Date of Patent: Jan. 2, 2007

(54) BALE PROCESSOR WITH FORK LIFT

(75) Inventors: Charles Lepage, Saskatoon (CA); David Patterson, Vonda (CA); Murray Kosokowsky, Pilger (CA); Kimball Lischynski, Saskatoon (CA)

(73) Assignee: Highline Manufacturing Ltd., Vonda (CA)

(*) Notice: Subject to any disclaimer, the term of this patent is extended or adjusted under 35 U.S.C. 154(b) by 18 days.

(21) Appl. No.: 10/776,317

(22) Filed: Feb. 11, 2004

(65) Prior Publication Data

US 2005/0035232 A1  Feb. 17, 2005

Related U.S. Application Data

(62) Division of application No. 10/090,213, filed on Mar. 4, 2002, now Pat. No. 6,708,911.

(51) Int. Cl.
*B60P 1/48* (2006.01)
*A01D 87/12* (2006.01)

(52) U.S. Cl. .............. 241/101.763; 241/101.761; 241/101.762; 241/605; 414/24.5

(58) Field of Classification Search ......... 241/101.761, 241/101.762, 101.763, 605
See application file for complete search history.

(56) References Cited

U.S. PATENT DOCUMENTS

| | | | |
|---|---|---|---|
| 2,952,466 A | 9/1960 | Carlson et al. | |
| 3,436,028 A | 4/1969 | Koehnen et al. | |
| 3,805,981 A * | 4/1974 | Christensen | 414/697 |
| 3,966,128 A | 6/1976 | Anderson et al. | 241/73 |
| 3,979,077 A | 9/1976 | Dalman | 241/101.7 |
| 3,999,674 A | 12/1976 | Meitl | 214/506 |
| 4,083,501 A | 4/1978 | Ryan | 241/101 A |
| 4,094,428 A | 6/1978 | White et al. | 241/505 |
| 4,101,081 A | 7/1978 | Ritter et al. | 241/101.7 |
| 4,134,554 A | 1/1979 | Morlock | 241/35 |
| 4,151,961 A | 5/1979 | Makofka et al. | 241/101 A |
| 4,218,022 A | 8/1980 | Boehm et al. | 241/101.7 |
| 4,227,654 A | 10/1980 | Seefeld et al. | 241/34 |
| 4,325,666 A * | 4/1982 | Chain et al. | 414/24.5 |
| 4,348,143 A * | 9/1982 | Hedgespeth | 414/24.5 |
| 4,448,361 A | 5/1984 | Marcy | 241/101.7 |
| 4,449,672 A | 5/1984 | Morlock et al. | 241/101.7 |
| 4,524,916 A | 6/1985 | Keyes et al. | 241/101 A |
| 4,597,703 A | 7/1986 | Bartolini | 414/24.6 |
| 4,621,776 A | 11/1986 | Hostetler | 241/101.7 |
| 4,657,191 A | 4/1987 | Dwyer et al. | 241/101.7 |
| 4,779,810 A | 10/1988 | Frey | 241/101 A |
| 4,830,292 A | 5/1989 | Frey | 241/101 A |
| 4,938,652 A * | 7/1990 | Sanderson | 414/718 |
| 4,951,883 A | 8/1990 | Loppoli et al. | 241/101 B |

(Continued)

FOREIGN PATENT DOCUMENTS

CA    2066431    3/1991

(Continued)

OTHER PUBLICATIONS

Advertisement entitled "Kwikmixer—3" Henke Machine Inc.

(Continued)

*Primary Examiner*—Lowell A. Larson
*Assistant Examiner*—Jason Y. Pahng
(74) *Attorney, Agent, or Firm*—Gray, Plant, Mooty, Mooty & Bennett PA; Michael A. Bondi

(57) ABSTRACT

An apparatus for disintegrating bales of agricultural materials such as hay. The apparatus includes a processing tub and is provided with a novel adjustable fork-lift adapted to raise bales of different size and configuration into the processing tub.

5 Claims, 15 Drawing Sheets

U.S. PATENT DOCUMENTS

| | | | |
|---|---|---|---|
| 5,033,683 A | 7/1991 | Taylor | 241/101 A |
| 5,071,079 A | 12/1991 | Fykse et al. | 241/101 A |
| 5,090,630 A | 2/1992 | Kopecky et al. | 241/279 |
| 5,169,078 A | 12/1992 | Lamar | 241/222 |
| 5,207,391 A | 5/1993 | Anderson | 241/186.4 |
| 5,255,867 A | 10/1993 | Whittleton et al. | 241/101.7 |
| 5,338,148 A * | 8/1994 | Ronnblom | 414/667 |
| 5,340,040 A | 8/1994 | Bussiere et al. | |
| 5,368,238 A | 11/1994 | Bergkamp et al. | 241/30 |
| 5,562,392 A * | 10/1996 | Raben | 414/608 |
| 5,601,241 A | 2/1997 | Brewster | 241/101.76 |
| 5,622,323 A | 4/1997 | Krueger et al. | 241/101.76 |
| 5,653,394 A | 8/1997 | Bussiere et al. | 241/101.742 |
| 5,738,287 A | 4/1998 | Vanderberg | 241/101.76 |
| 5,950,935 A | 9/1999 | Seymour | 239/670 |
| 5,967,427 A | 10/1999 | Seymour | 239/676 |
| 6,109,553 A | 8/2000 | Hruska | 241/189.1 |
| 6,199,781 B1 * | 3/2001 | Hruska | 241/101.763 |
| 6,202,950 B1 | 3/2001 | Hruska | 241/189.1 |

FOREIGN PATENT DOCUMENTS

| | | |
|---|---|---|
| CA | 2142116 | 2/1994 |
| CA | 2086569 | 1/1995 |
| CA | 2171146 | 9/1997 |
| CA | 2179121 | 12/1997 |
| CA | 2236953 | 5/1998 |
| CA | 2191692 | 10/1998 |
| CA | 2202014 | 10/1998 |
| CA | 2246465 | 11/2000 |
| CA | 2295417 | 7/2001 |
| DE | 198 14 011 A | 10/1998 |
| GB | 2100106 | 12/1982 |
| GB | 2101882 | 1/1983 |
| GB | 2 255 956 A | 11/1992 |

OTHER PUBLICATIONS

Advertisement entitled "Silachop Bale Processor for easier feeding and higher feed in-take" UN7860 Silachop UN7865 Silachop, Kverneland Underhaug AS.

Advertisement entitled "Model BP-25 Bale Processor" Hesston The Prime Line, Hesston Corporation.

Advertisement entitled "Load and Feed Big Bales from Your Tractor or Pickup" DewEze Super Slicer, DewEze Mfg. Co.

Advertisement entitled "Bale Processor" Vermeer Manufacturing Company.

Internet advertisement entitled "HAYBUSTER" Dura Tech Industries International, Agricultural Product.

Internet advertisement entitled "8610 Bale Processor" Case IH Agricultural Equipment.

Advertisement entitled "Bale Processor" from Jiffy by Westward Products Ltd.

Advertisement entitled "Buffalo Round Bale Bunk Feeder Reduces Hay Waste" from Buffalo Equipment.

Advertisement entitled "New Holland Side-Delivery Manure Spreader 304/308".

Article by Janis Schole in Mar. 18, 1997 issue of Grain News.

Wheel and Deal newspaper, vol. 4, Issue #17.

Hub City Engineering Manual No. 4.

Excerpt from the book "Mechanical Engineering Design" dated 1989.

Bondioli and Pavesi, Quick reference—Gear Boxes Manual dated 1997.

Annex to Form PCT/ISA/206, Communication Relating to the Results of the Partial International Search for Application No. PCT/CA/02/00925. Dated Oct. 29, 2002. pp. 1 and 2.

\* cited by examiner

BALE PROCESSOR WITH FORK LIFT

CROSS REFERENCE TO RELATED APPLICATIONS

The present application is a divisional application of application Ser. No. 10/090,213, U.S. Pat. No. 6,708,911 filed Mar. 4, 2002.

FIELD OF THE INVENTION

The invention relates to an improved apparatus for disintegrating bales of agricultural material such as hay.

BACKGROUND

Bale processors, including processors of the type having a tub with longitudinally disposed disintegration flail rollers and bale support rollers (as disclosed in Canadian Patent No. 2,086,569 owned by the applicant herein) are known. However, primarily due to the large size and weight of modern "square" bales (which have a rectangular configuration), problems may be encountered with operational flexibility and durability of some processors. Further, the majority of the processors known to the inventors are only adapted to process one type of common form of bale (i.e. "round" or "square") and are only adapted to discharge out of one side of the processor. Moreover, some known processors are not adapted for easy use with older tractors due to hydraulic feed line requirements exceeding the typical number of hydraulic ports on such tractors.

SUMMARY OF INVENTION

It is an object of the present invention to provide a bale processor having operational flexibility and enhanced durability. According to a broad aspect of the invention, the invention provides an apparatus for processing baled crop material comprising: a chassis having a front and back end and a left and right side; a processing tub having two opposing end walls, two opposing side walls and a discharge opening located in one of the side walls; a disintegrator mounted in the processing tub adapted to disintegrate baled crop material positioned within the tub and discharge the processed bale material out the discharge opening; and a manipulator mounted within the processing tub adapted to manipulate the baled crop material to expose different parts thereof to the disintegrator; wherein the processing tub is adapted to be mounted on the chassis such that the discharge opening can be positioned on either the left or right side of the chassis.

According to another aspect of the invention, the invention provides an apparatus for processing baled crop material comprising: a chassis having a front and back end and a left and right side; a processing tub having two opposing end walls, two opposing side walls and a discharge opening located in one of the side walls; a disintegrator mounted in the processing tub adapted to disintegrate baled crop material positioned within the tub and discharge the processed bale material out the discharge opening; and a manipulator mounted within the processing tub adapted to manipulate the baled crop material to expose different parts thereof to the disintegrator; wherein the processing tub is sized to accommodate a large square bale or, at least two round bales longitudinally therein for processing.

According to yet another aspect of the invention, the invention provides an apparatus for processing baled crop material comprising: a chassis having a front and back end and a left and right side; a processing tub having two opposing end walls, two opposing side walls and a discharge opening located in one of the side walls; a disintegrator mounted in the processing tub adapted to disintegrate baled crop material positioned within the tub and discharge the processed bale material out the discharge opening; a manipulator mounted within the processing tub adapted to manipulate the baled crop material to expose different parts thereof to the disintegrator; and a fork lift mounted on the rear of the chassis to raise baled crop material from the ground into the processing tub wherein the fork lift is adjustable to receive baled crop material of different configurations.

According to yet another aspect of the invention, the invention provides an apparatus for processing baled crop material comprising: a chassis having a front and back end and a left and right side; a processing tub having two opposing end walls, two opposing side walls and a discharge opening located in one of the side walls; a disintegrator mounted in the processing tub adapted to disintegrate baled crop material positioned within the tub and discharge the processed bale material out the discharge opening; a manipulator mounted within the processing tub adapted to manipulate the baled crop material to expose different parts thereof to the disintegrator; at least one hydraulic motor for driving the manipulator; a discharge door pivotally mounted above the discharge opening to direct processed bale material discharged from the discharge opening; at least one hydraulic cylinder attached to the discharge door to raise and lower the discharge door; a selector valve having a first output connected to the at least one hydraulic motor and a second output connect to the at least one hydraulic cylinder, the selector valve being adapted to move between a first setting and second setting wherein hydraulic fluid flow from an input hydraulic line is directed to the first output or the second output respectively; and an actuator to move the selector valve between the first setting and the second setting.

According to yet another aspect of the invention, the invention provides an apparatus for processing baled crop material comprising: a chassis having a front and back end and a left and right side; a processing tub having two opposing end walls, two opposing side walls and a discharge opening located in one of the side walls; a disintegrator mounted in the processing tub adapted to disintegrate baled crop material positioned within the tub and discharge the processed material out the discharge opening; and a manipulator mounted in the processing tab adapted to manipulate the baled crop material to expose different parts thereof to the disintegrator; wherein the chassis has two ground engaging wheels rotatably mounted on an adjustable axle such that the distance between the two wheels can be adjusted.

The invention provides an improved bale processor that is easily convertible from a left-hand discharge arrangement to a right-hand discharge arrangement. Furthermore, the bale processor can process a large square bale or, alternatively, one or more round bales and includes an adjustable bale loading mechanism for loading bales of different configurations. Moreover, the bale processor includes a hydraulic selector assembly such that a single set of hydraulic lines can be used to operate two separate hydraulic systems on the bale processor.

BRIEF DESCRIPTION OF THE DRAWINGS

Preferred embodiments of the invention will now be described by way of example with reference to the attached drawings in which.

DETAILED DESCRIPTION OF PREFERRED EMBODIMENTS

Figure 1:
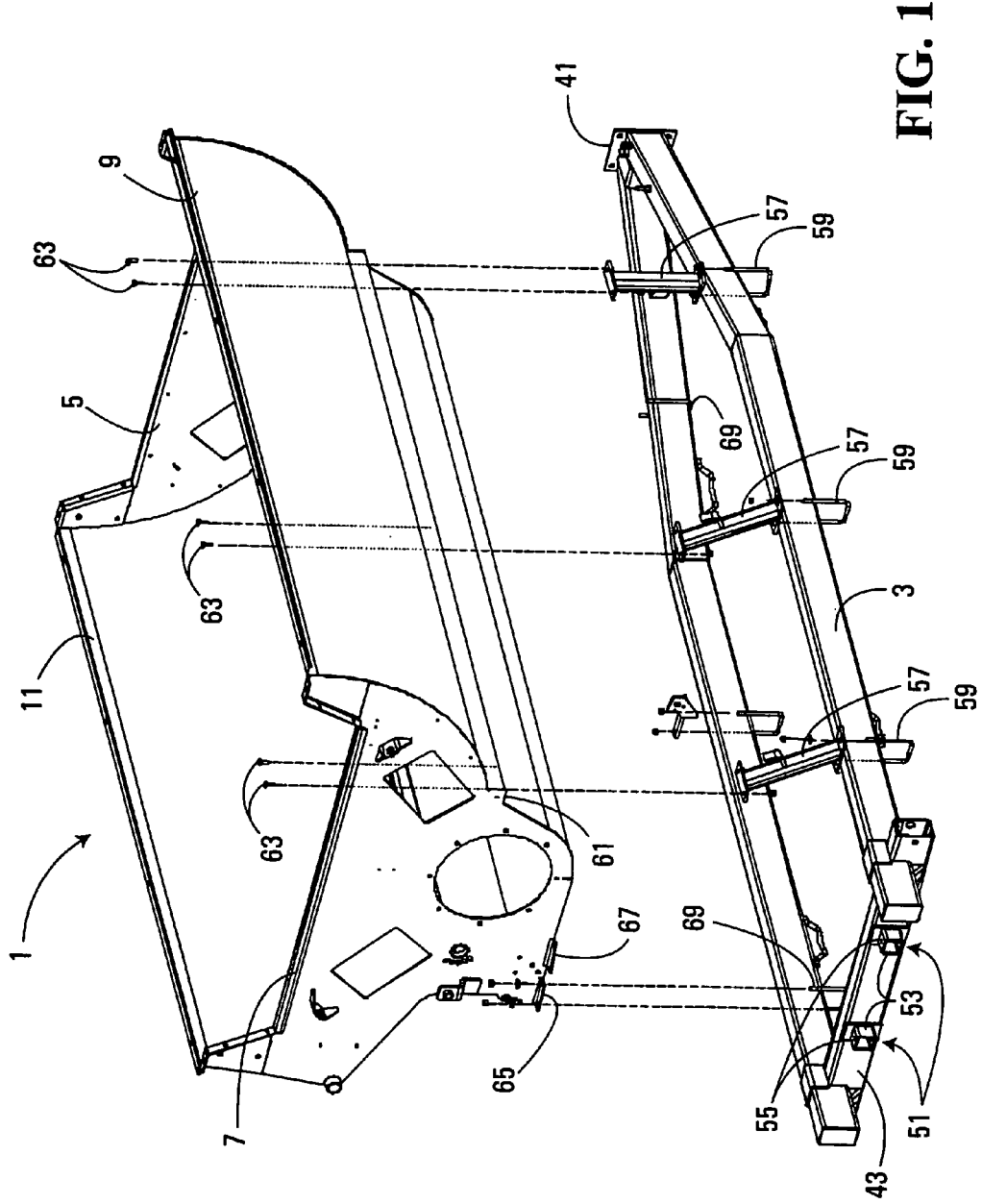
FIG. 1 is an exploded perspective view of a bale processor according to an embodiment of the invention in the left-hand discharge arrangement.
Figure 2:
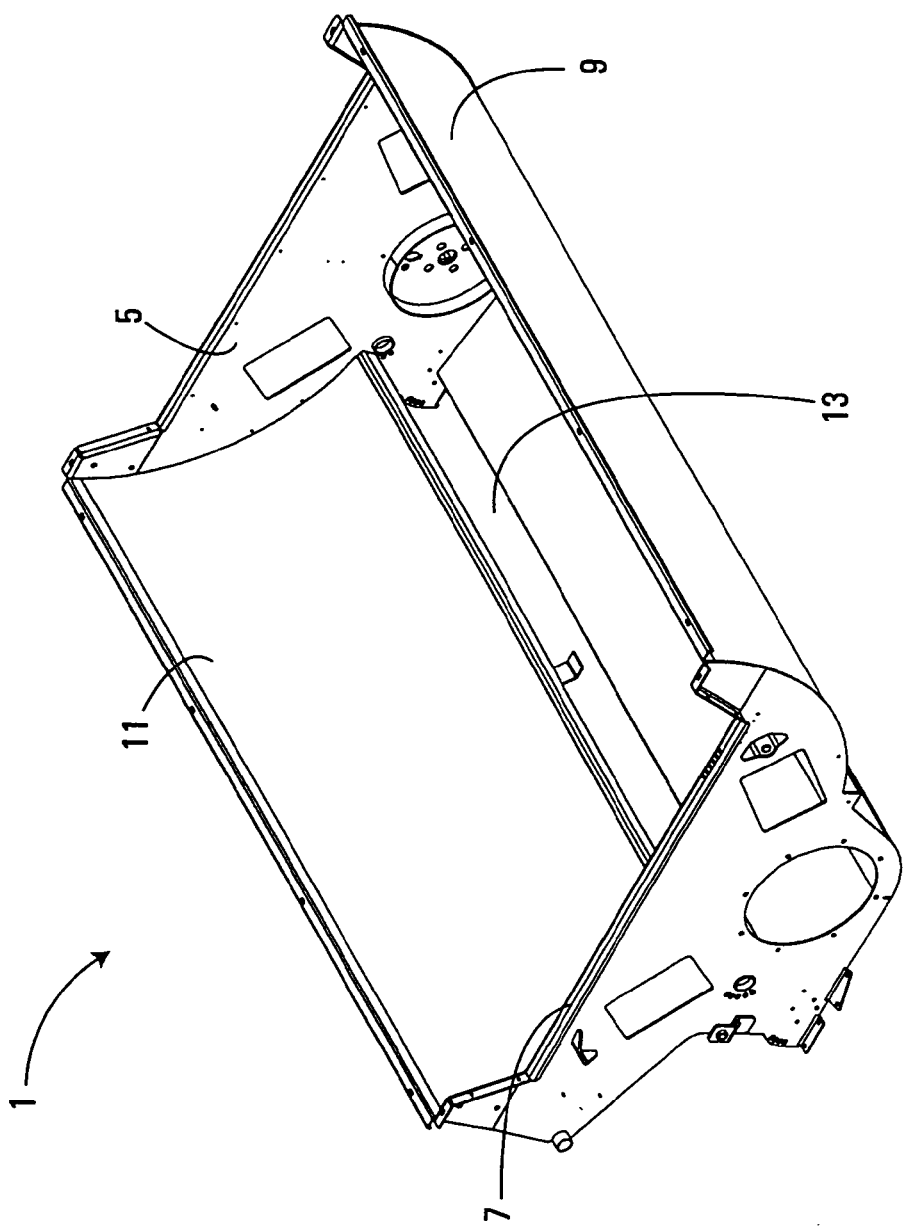
FIG. 2 is a perspective view of the processing tub of a bale processor according to an embodiment of the invention.

As shown in FIGS. 1 and 2, the bale processor comprises a processing tub 1 mounted on a chassis 3. The tub 1 has end walls 5 and 7 and side walls 9 and 11. A discharge opening 13 is provided at the bottom of side wall 11; In the embodiment shown in FIGS. 1 and 14, side wall 11 is located on the left-hand side of the bale processor. As discussed below, the processing tub 1 and the chassis 3 are designed such that the processing tub can be rotated 180 degrees to position side wall 11 on the right-hand side of the apparatus (see FIGS. 6 and 15).

The processing tub 1 is sized such that a large square bale may be positioned lengthwise therein for processing. Typically, an inside width of approximately 7.5 feet (side wall 9 to side wall 11) and an inside length of at least 10 feet (from end wall 5 to end wall 7) is sufficient to accommodate most large bales. A tub of these dimensions can also accommodate two or more round bales lengthwise therein for processing at the same time.

Figure 3:
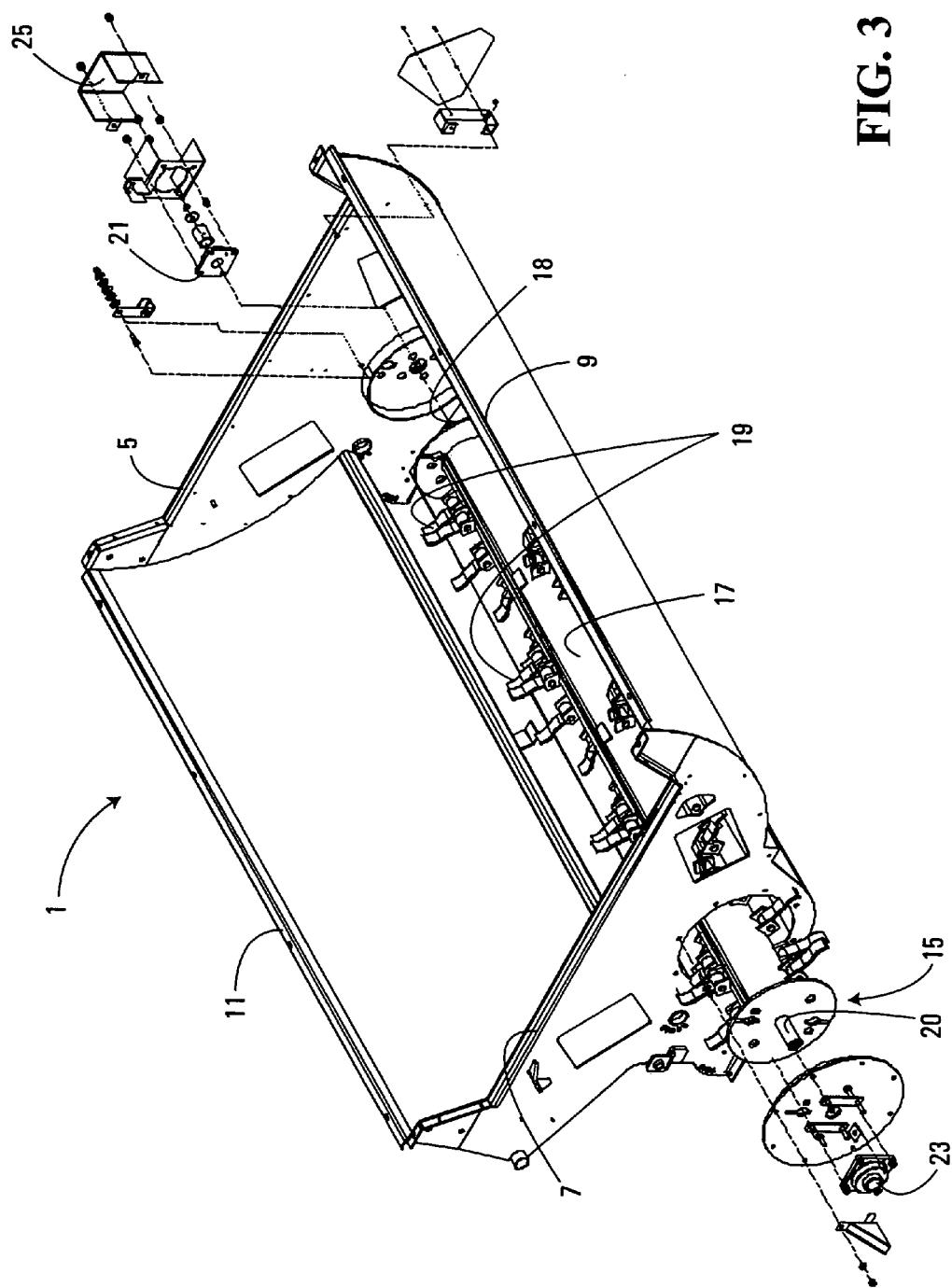
FIG. 3 is an exploded perspective view of the processing tub of a bale processor according to an embodiment of the invention with a disintegrator mounted therein.

As shown in FIG. 3, a disintegration member 15 is mounted within the processing tub 1. In the embodiment illustrated, the disintegration member 15 comprises a flail roller 17 extending the length of the processing tub 1 and mounted in the bottom thereof. The flail roller 17 is rotatable about its longitudinal axis such that a series of flails 19 pivotally mounted thereon extend to engage and separate the baled material contained within the processing tub 1.

The flail roller 17 is rotated by a power source (not shown). In the embodiment shown, the flail roller 17 is adapted to be detachably connected by a PTO drive of a tractor. The flail roller 17 is provided with axial rods 18 and 20 extending from opposing ends thereof. The flail roller 17 is secured in the processing tub 1 by axial rods 18 and 20 extending through a set of bearings 21 and 23 mounted on end walls 5 and 7 respectively, thereby permitting axial rotation of the flail roller. As discussed below, both axial rods 18 and 20 are adapted to be detachably connected to the PTO of a tractor.

Figure 4:
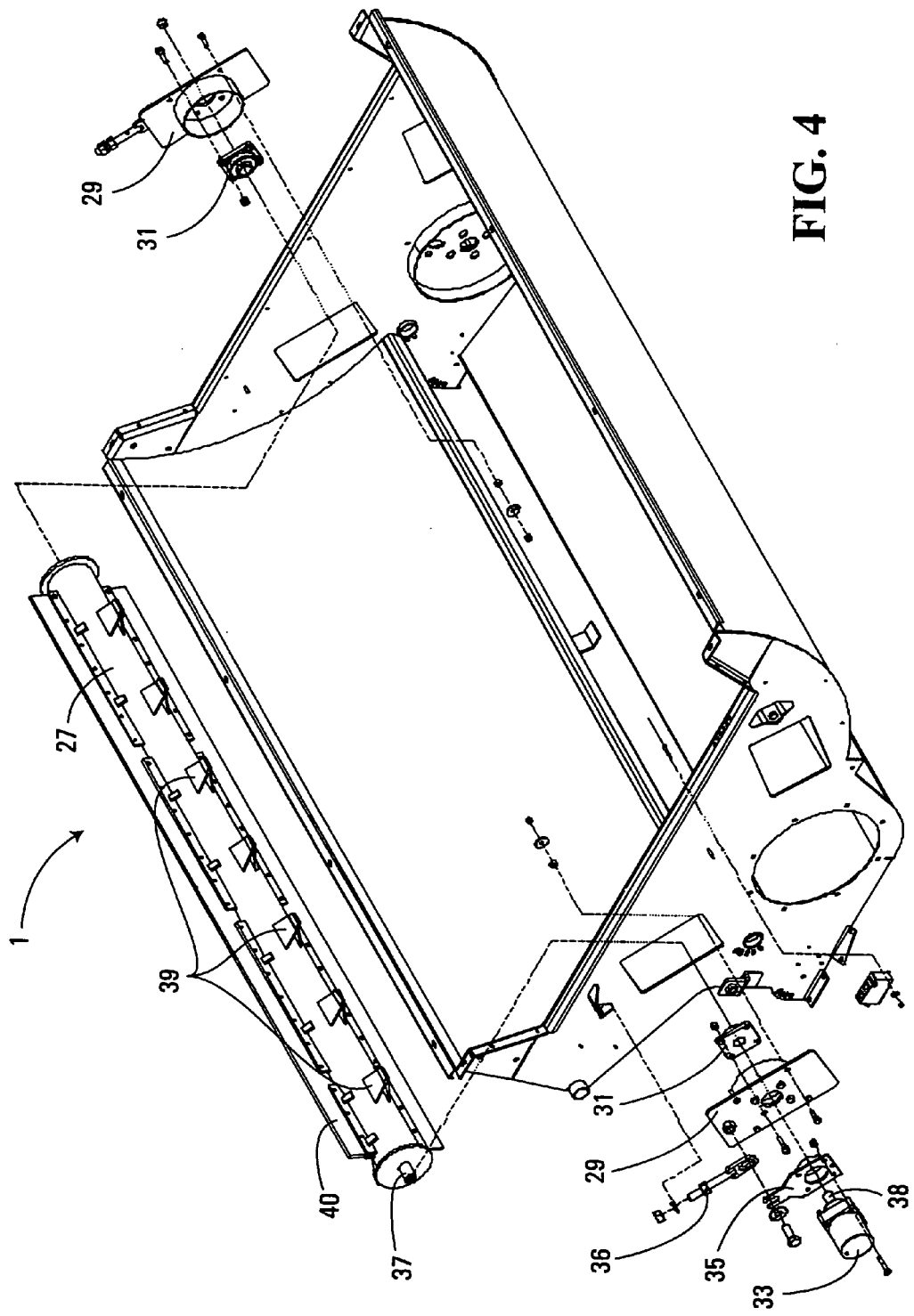
FIG. 4 is an exploded perspective view of the processing tub of a bale processor according to an embodiment of the invention with a feed roller mounted therein.

As shown in FIG. 4, the processing tub 1 is provided with a bale manipulator. In the embodiment shown, the bale manipulator comprises a feed roller 27 positioned on each side of the flail roller 17, each feed roller extending the length of the processing tub 1. The feed rollers 27 are positioned such that the flails 19 engage the baled material between the feed rollers when the flail roller 17 is rotated. The side walls 9 and 11 of the tub 1 are shaped such that material is directed into the flail roller 17.

Each feed roller 27 is rotatable in either direction about its longitudinal axis by a reversible hydraulic motor 33. As shown in FIG. 4, each feed roller 27 is mounted to end walls 5 and 7 by a roller mount 29 secured on the end walls 5 and 7 by an adjustable hanger 36. A set of bearings 31 is positioned within each roller mount 29 to support the feed roller 27 while permitting rotation thereof. The specifications for the bearings 31 are selected depending upon the typical load conditions of the feed roller 27 during operation.

Each hydraulic motor 33 is mounted on to a motor mount 35 which is secured at the upper end thereof to the adjustable hanger 36 and roller mount 29. The hydraulic motor 33 is detachably connected to the end of feed roller 27. In the. embodiment shown, each end of each feed roller 27 has an axial rod 37 extending from it. The axial rods has a splined female connection (not shown) adapted to releasably receive a splined shaft 38 of the hydraulic motor 33. Alternative arrangements for connecting the hydraulic motor to the feed roller would be known to those skilled in the art.

Each of the feed rollers 27 has teeth 39 and flanges 40 extending radially therefrom. The teeth 39 and flanges 40 engage the baled material as the feed roller 27 rotates thereby rotating the baled material and exposing different sections thereof to the flails 19 for disintegration.

Figure 5:
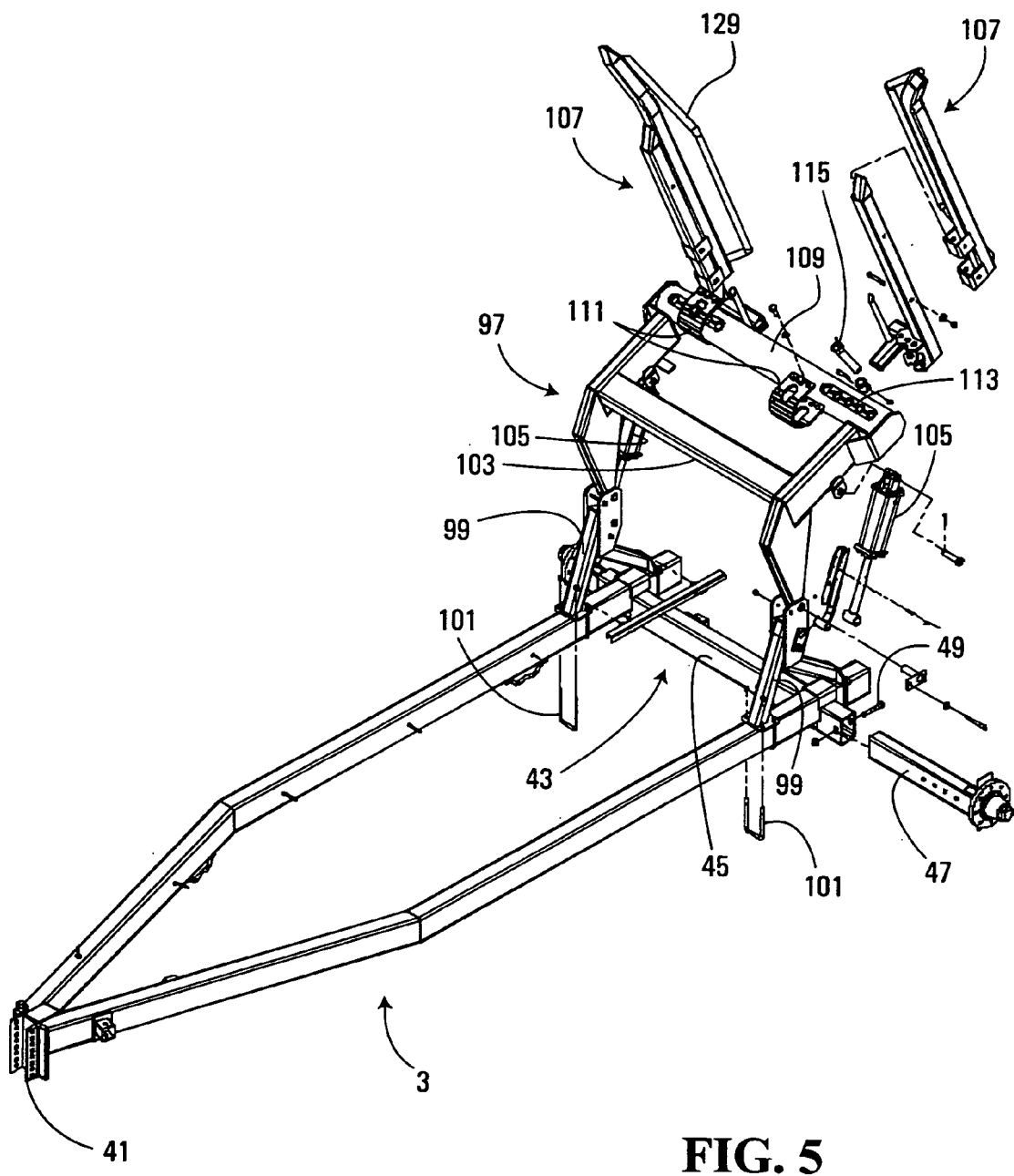
FIG. 5 is a partially exploded perspective view of a chassis of a bale processor with a fork lift mounted on the rear thereof according to an embodiment of the invention.

As shown in FIGS. 1 and 5, the chassis 3 includes a hitch 41 mounted at the front thereof and an axle 43 positioned near the rear. As best seen in FIG. 5, axle 43 has a hollow center portion 45 extending transversely across and secured to chassis 3 and end portions 47 adapted to be inserted therein on each side of the chassis 3. A ground engaging wheel (not shown) is attached to each end portion 47. Each end portion 47 are adapted to slide axially within the center portion 45 to adjust the width of axle 43. End portions 47 are lockable at the desired location by insertion of a locking pin 49 through holes provided in the center portion 45 and in the end portions 47. Accordingly, the axle 43 can be widened to provide the apparatus with more stability over uneven terrain or narrowed to facilitate transport along a road or highway.

As shown in FIG. 1, axle 43 is also provided with jack mounts 51 to facilitate connection to a jack assembly (not shown). Each jack mount comprises a square bracket 53 with a hole 55 in the top and bottom thereof. The square bracket 53 is sized to accept the male connection of the jack assembly. A locking pin (not shown) is inserted through the holes 55 to maintain the jack assembly connected during operation. The jack assembly is used to raise a side of the bale processor such that the width of the axle 43 can be adjusted as set out above.

Figure 6:
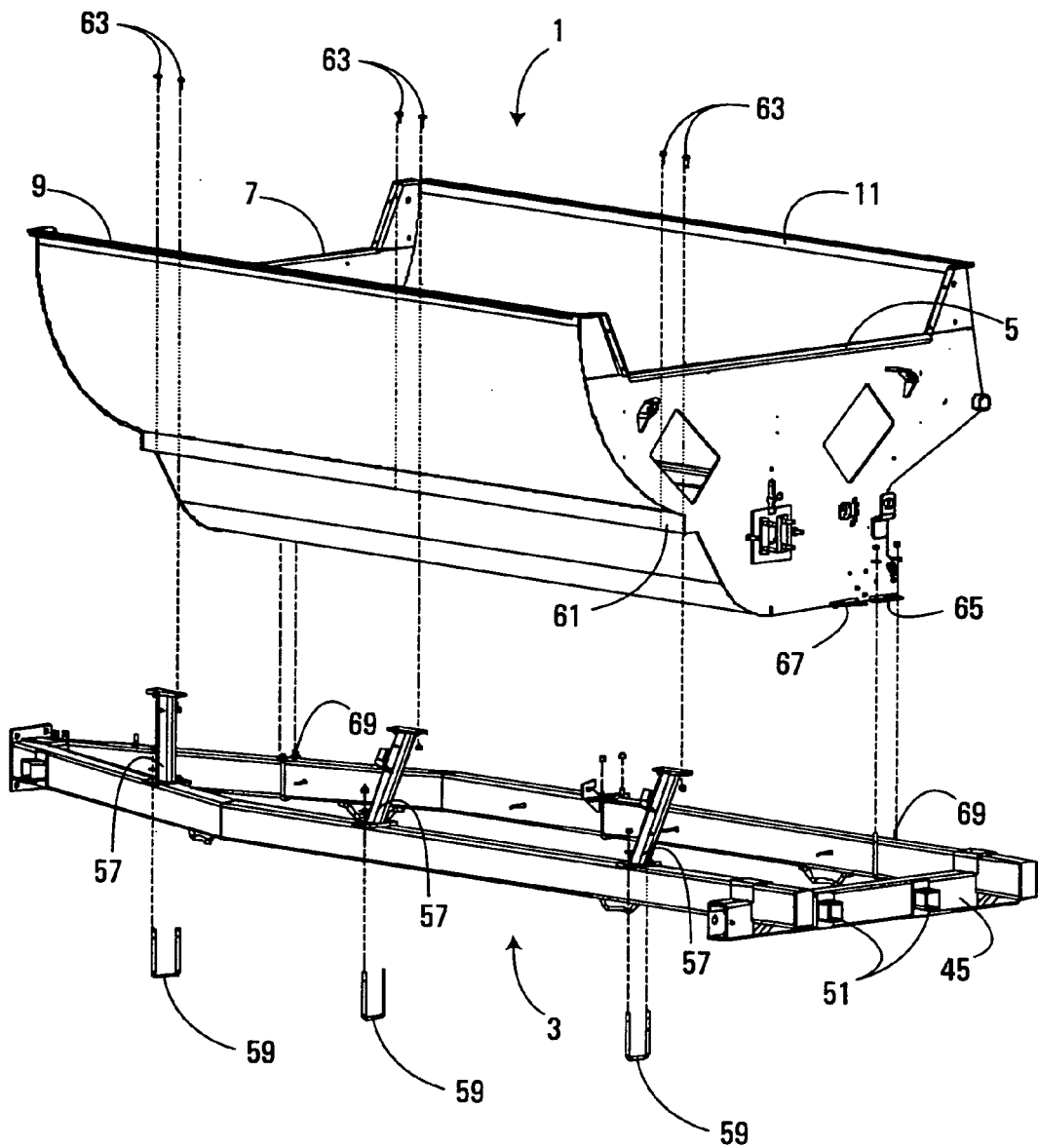
FIG. 6 is an exploded perspective view of a bale processor according to an embodiment of the invention in the right-hand discharge arrangement.
Figure 14:
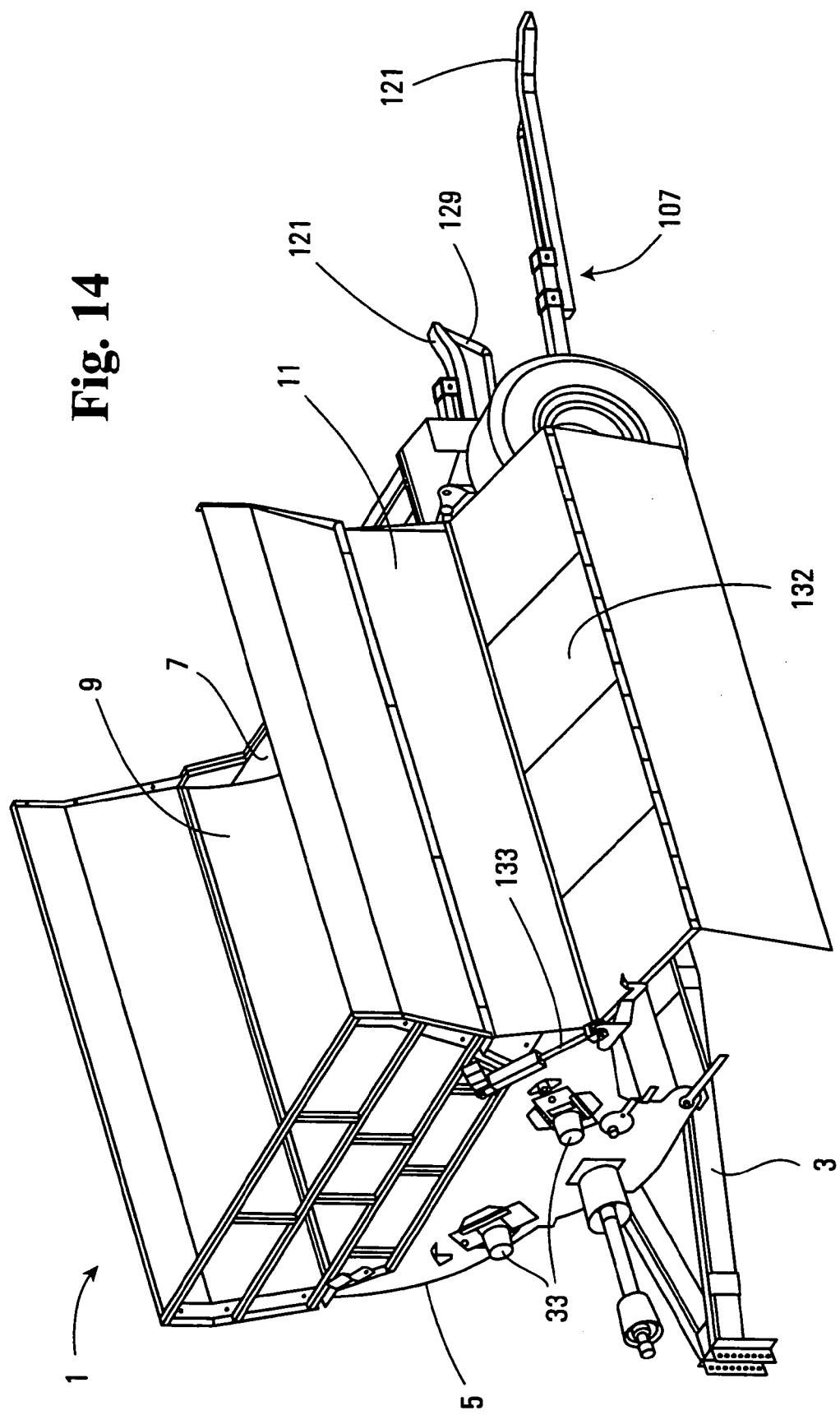
FIG. 14 is a perspective view of a bale processor according to an embodiment of the invention in the left-hand discharge arrangement.
Figure 15:
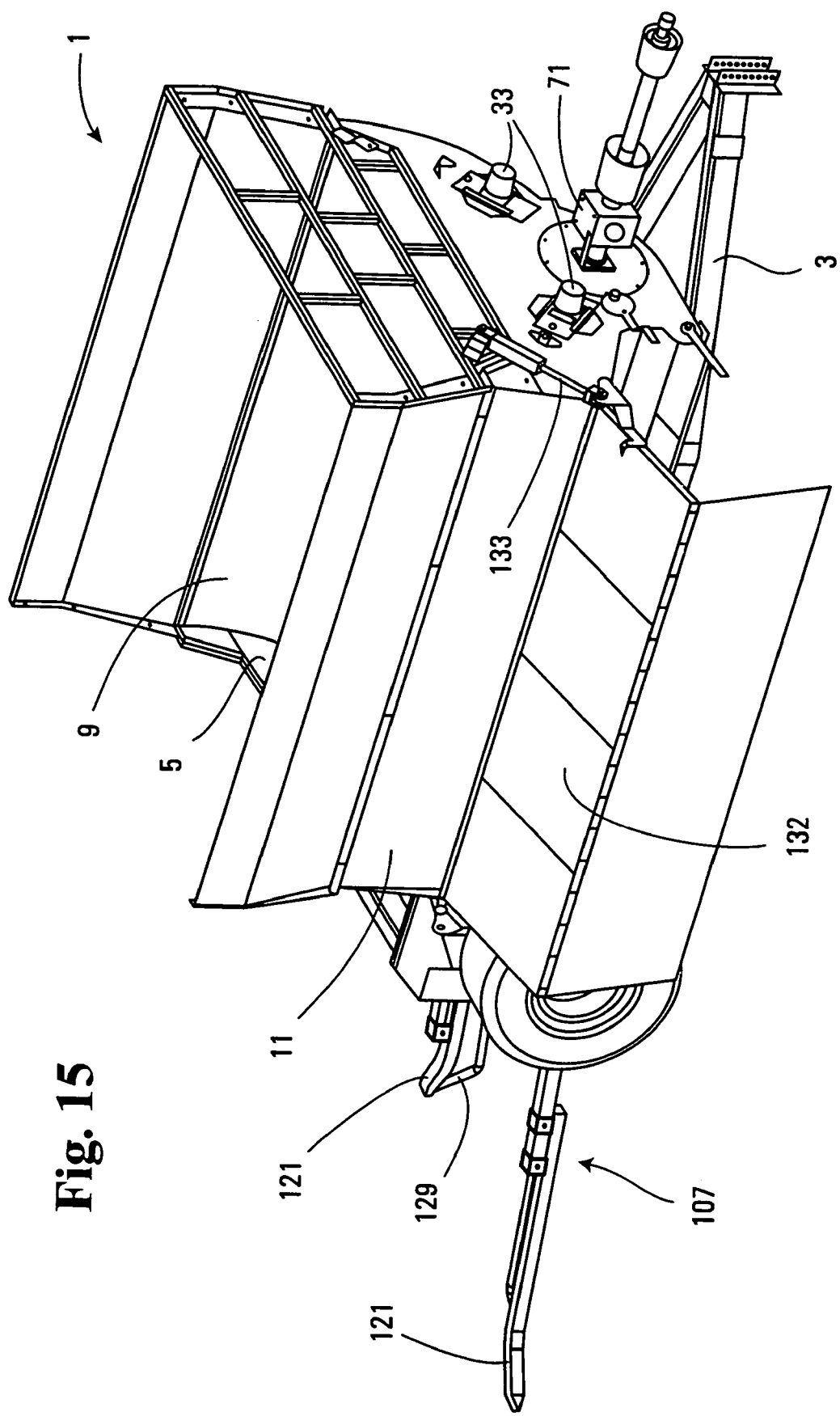
FIG. 15 is a perspective view of a bale processor according to an embodiment of the invention in the right-hand discharge arrangement.

The processing tub 1 is detachably connected to the chassis 3 such that apparatus can be converted from a left-hand discharge arrangement as shown in FIGS. 1 and 14 to a right-hand discharge apparatus as shown in FIGS. 6 and 15 or vice-a-versa. The processing tub 1 has front to back symmetry to facilitate the conversion.

As shown in FIG. 1, in the left-hand discharge arrangement, three support legs 57 are bolted to the right-hand side of the chassis 3 by U-shaped bolts 59. A step 61 extending the length of side wall 9 is positioned on the top of the support legs 57. The processing tub 1 is connected to the support legs 57 by bolts 63. End walls 5 and 7 of the processing tub 1 are provided with brackets 65 and 67 at the bottom thereof for connecting the processing tub 1 to the chassis 3 by U shaped bolts 69. In the arrangement shown in FIG. 1, as a result of the configuration of the chassis 3, bracket 65 on end wall 7 and bracket 67 on end wall 5 are use to connect the processing tub 1 to the left side of chassis 3.

Figure 7:
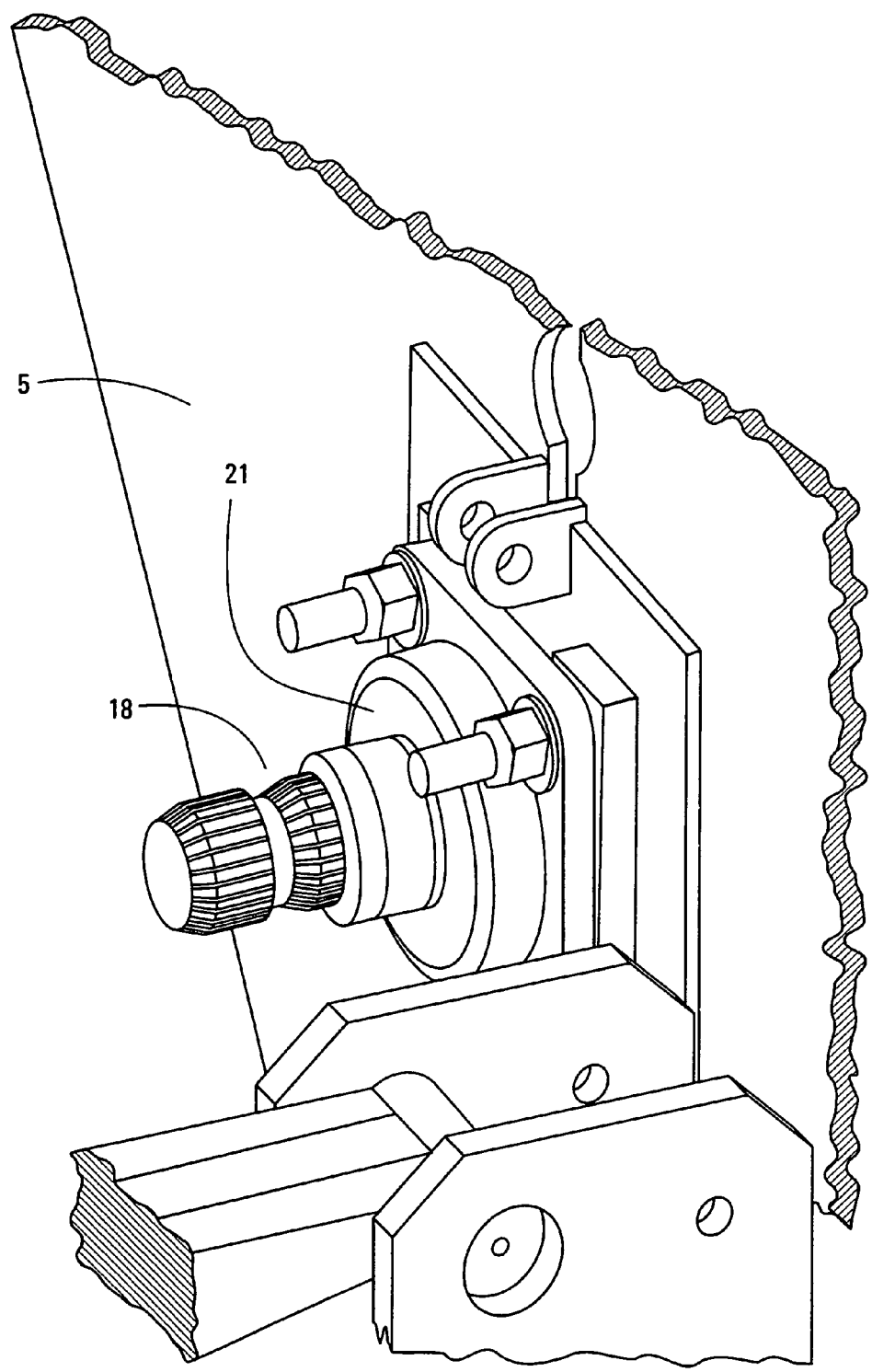
FIG. 7 is a perspective view of an end of the disintegrator adapted for connection to the PTO of a tractor according to an embodiment of the invention.

In the left-hand discharge arrangement, the flail roller 17 is rotated in a clockwise direction (viewed from the rear of the machine). Accordingly, the flail roller 17 can be connected directly to the PTO of most tractors. As shown in FIG. 7, the axial rod 18 is splined at the end thereof for insertion into the female splined connection on the standard PTO of a tractor.

As shown in FIG. 6, the bale processor is converted to the right-hand discharge arrangement by disconnecting the processing tub 1 from the chassis 3 and the support legs 57. The support legs 57 are subsequently disconnected from the chassis 3 and moved to left side of the chassis 3 and secured thereto by U-shaped bolts 59. The processing tub 1 is rotated by 180 degrees thereby positioning side wall 11 on the right-hand side of the apparatus. Step 61 in side wall 11 is positioned on top of support legs 57 and secured thereto by bolts 63. The tub is attached to the right-hand side of chassis 3 by securing bracket 65 on end wall 5 and bracket 67 on end wall 7 to the right side of the chassis with U-shaped bolts 69.

Prior to conversion of the apparatus from the left-hand discharge arrangement shown in FIGS. 1 and 14 to the right-hand discharge arrangement shown in FIGS. 6 and 15, the hydraulic motors 33 and hydraulic motor mounts 35 must be disconnected and the flail drum 17 disconnected from the power source. Any other hydraulics or other systems would also be disconnected. Once the processing tub 1 is arranged in the right-hand discharge arrangement, the hydraulic motors 33 and motor mounts 35 are connected to end wall 7 of the processing tub 1 now located at the front of the chassis 3. As bearings 31 are provided at each end of the feed rollers 27, the feed rollers need not be removed to move the bearings from one end of the feed rollers to the other.

Any other hydraulics or other systems are also reconnected to the bale processor once the processing tub 1 is secured to the chassis. In particular, the power source is connected to axial rod 20. However, in the right-hand discharge arrangement, the flail roller 17 must be rotated in a counter-clockwise direction (when viewed from the rear) during operation. Accordingly, if the power source rotates in a clockwise direction (i.e. a PTO of a typical tractor) a rotation conversion device must be positioned between the power source and the flail roller 17.

Figure 8:
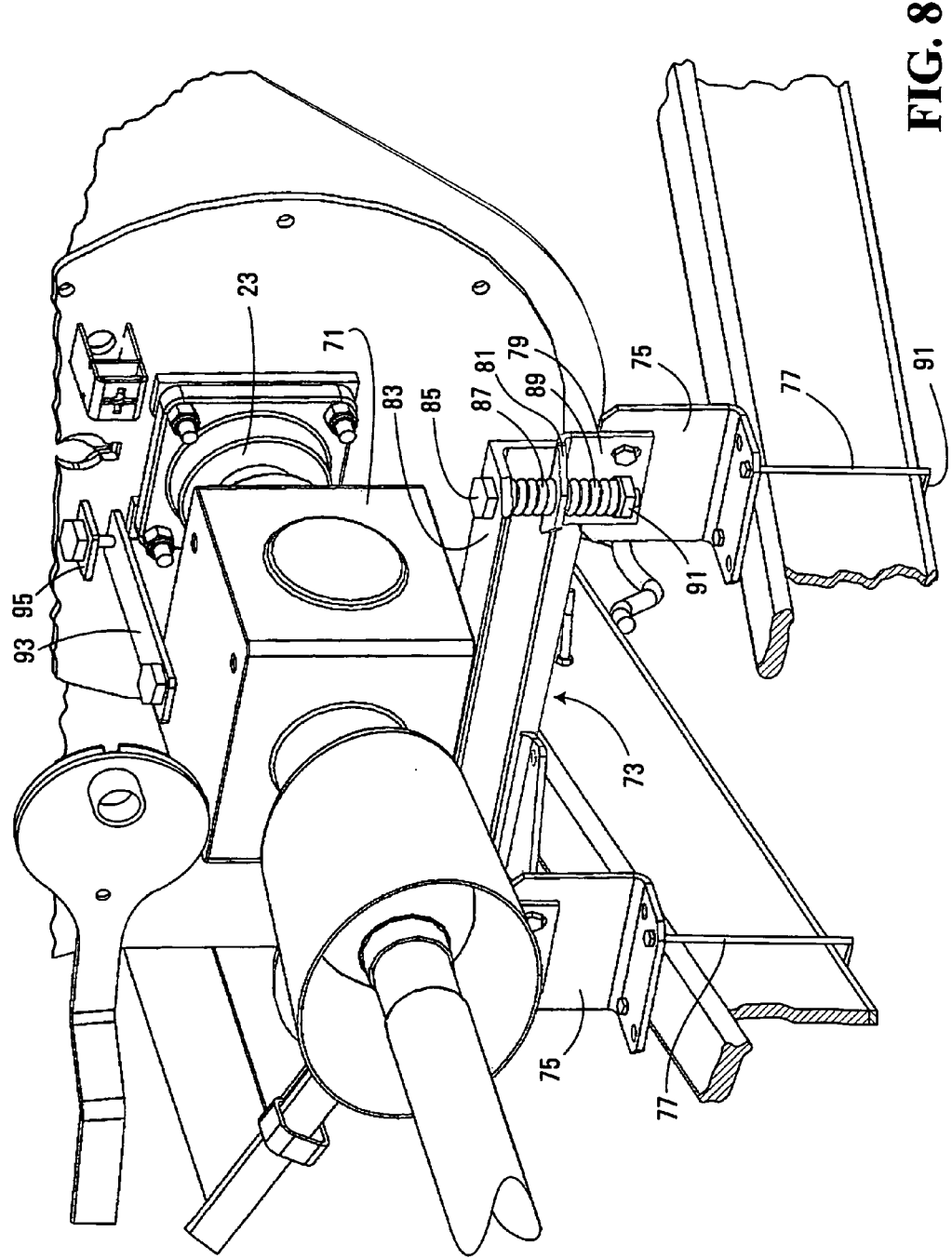
FIG. 8 is a perspective view of a rotation conversion device for a right-hand discharge arrangement of a bale processor according to an embodiment of the invention.

In the embodiment shown in FIG. 8, the rotation conversion device comprises a gearbox 71 of the type commonly used in the industry. The gearbox 71 is positioned on a dampener 73 to reduce the load on bearings 23 and the power source due to the weight of the rotation conversion device. In addition, the dampener 73 also serves to absorb the vibrations and rotation of the gearbox 71 during acceleration or deceleration, especially during the start-up and shut down.

The damping mechanism 73 is mounted to the chassis 3 by brackets 75 which are secured to the chassis by U-shaped bolts 77. An upper support 79 having a lip 81 is secured to each of the brackets 75. A cross support 83 is secured to bottom of gearbox 71 and extends between brackets 75. The cross support 83 is mounted to each of the upper supports 79 by bolts 85 which extend through the cross support and through lips 81. Upper compression springs 87 are axially mounted on bolts 85 between the cross supports 83 and the lips 81 of upper supports 79. Lower compression springs 89 are positioned on bolts 85 below lips 81 and maintained in position by a nut 91.

The upper compression springs 87 are compressed to exert a slight upper pressure on the gearbox 71 to remove stresses of the weight of the gearbox from bearings 23 and the power source. Furthermore, during operation, as the gearbox 71 rotates, opposing upper and lower compressions springs 87 and 89 co-operate to return the cross support 83, and thus the gearbox 71, to a level position.

Figure 9:
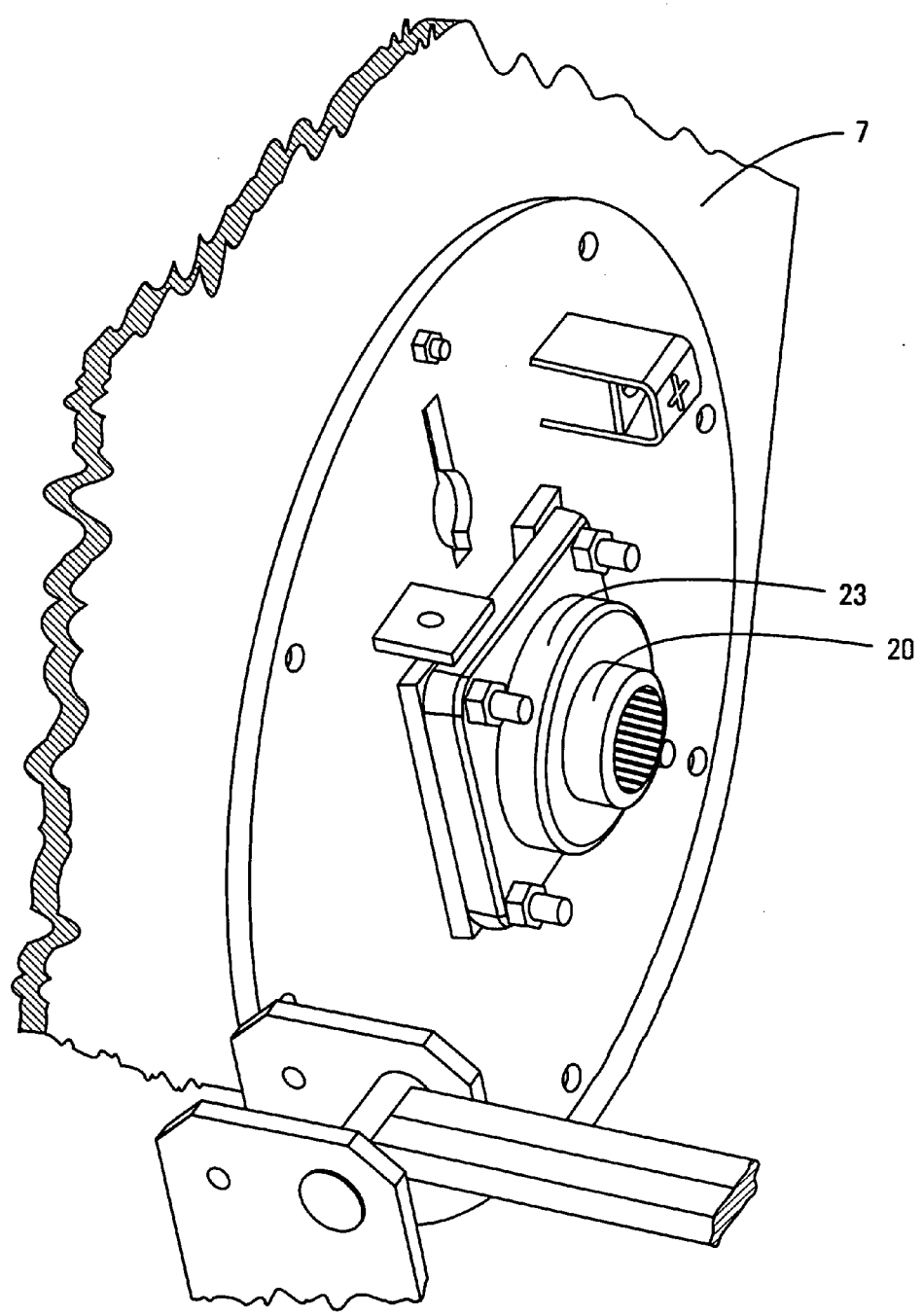
FIG. 9 is a perspective view of an end of the disintegrator adapted for connection to the rotation conversion device according to an embodiment of the invention.

Gearboxes known in the art are typically provided with a male splined connector for connecting to the input and output shafts (not shown). Accordingly, as shown in FIG. 9, axial rod 20 is provided with a female splined connector adapted to receive the male splined connector of gearbox 71. As shown in FIG. 8, a connection arm 93 is attached to the top of the gearbox 71 at one end thereof and secured to a bracket 95 mounted on the processing tub 1. The connection arm prevents the gearbox 71 from pulling away from the processing tub 1 thereby disconnecting from the axial rod 20.

It would be understood by those skilled in the art that alternative rotation conversion devices, such as a belt or chain arrangement could be used without departing from the invention in its broadest aspect.

As shown in FIG. 3, a protective covering 25 is provided to cover the axial rod 18 or 20 extending from the back end wall of the machine. In the right-hand discharge arrangement shown in FIG. 3, the protective covering 25 is mounted on end wall 5 to cover the portion of axial rod 18 extending through bearings 21.

Figure 10:
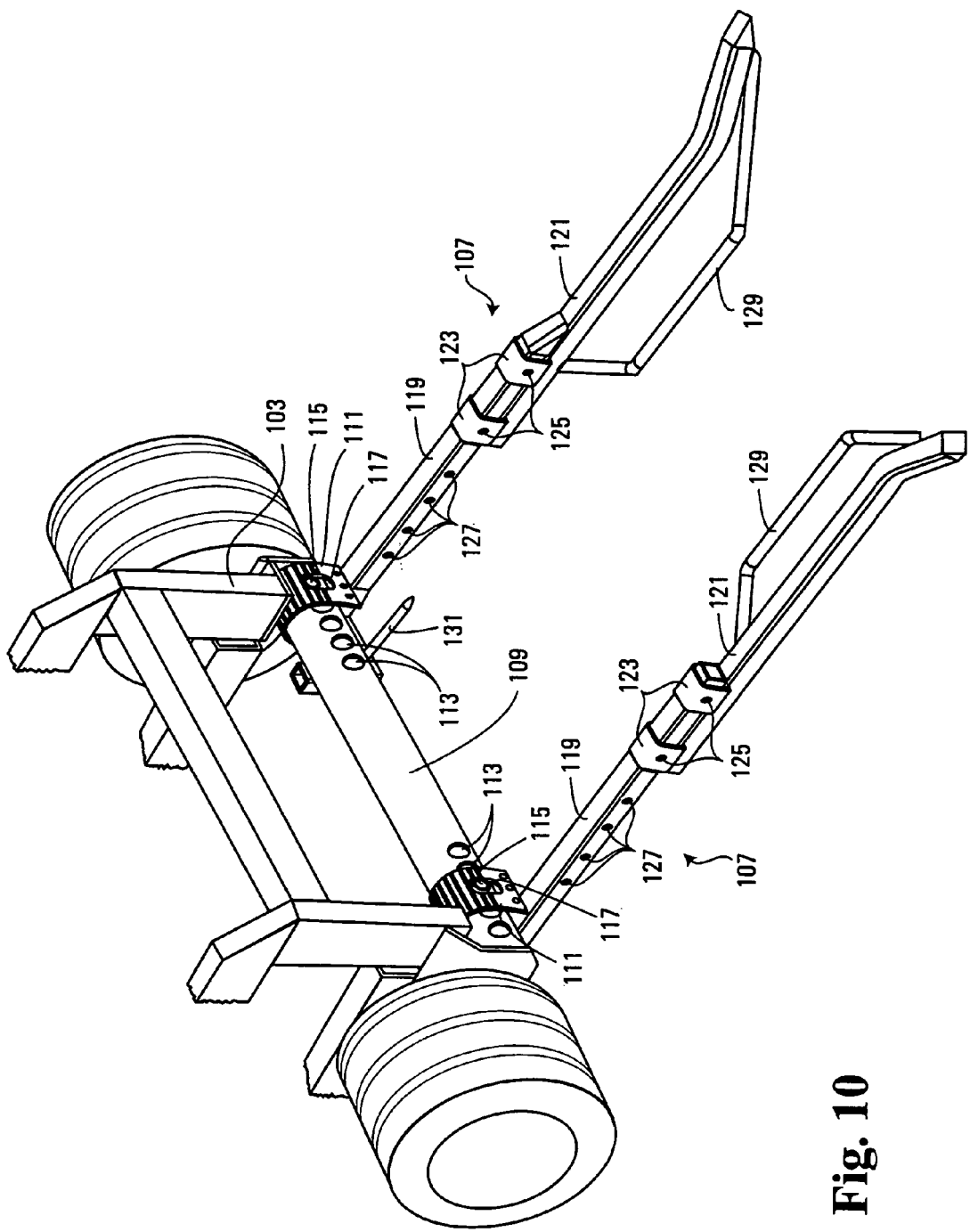
FIG. 10 is a perspective view of a fork lift of a bale processor according to an embodiment of the invention.

As shown in FIGS. 5 and 10, an adjustable fork lift 97 is mounted on the rear of chassis 3 for raising baled material into the processing tub 1. The adjustability of the fork lift 97 permits bales of different configurations to be lifted into the processing tub 1 (i.e. large "square" bales or one or more "round" bales). The fork lift 97 is mounted to each side of the chassis 3 by a mounting bracket 99 secured to the chassis by U-shaped bolts 101. An L-shaped fork lift frame 103 is pivotally attached to each of the mounting brackets 99. A hydraulic cylinder 105 is pivotally mounted between the fork lift frame 103 and mounting brackets 99 to raise and lower the fork lift frame.

Two forks 107 are mounted to a bottom cross bar 109 of the fork lift frame 103 by curved brackets 111. The curved brackets 111 are adapted to slide axially along the cross bar 109 to adjust the separation between the two forks 107. Each side of the cross bar 109 is provided with a series of adjustment holes 113 to receive a locking pin 115 which is inserted through a hole 117 provided in the front of curved brackets 111 to lock the forks 107 at the desired location.

As best shown in FIG. 10, the length of each fork 107 is also adjustable. Each fork 107 includes a rear section 119 and a front section 121 mounted on the rear section by square brackets 123. The square brackets 123 slide axially along the rear section 119 to adjust the length of the fork 107. Each square bracket 123 is provided with holes 125 on opposing sides thereof and the rear section is provided with a series of adjustment holes 127. Accordingly, the fork 107 can be locked at a desired length by insertion of a locking pin or bolt through the holes 125 in the square brackets 123 and one of the adjustment holes 127 in the rear section 119.

The front section 121 of each fork 107 has a bale carrier 129 extending inwardly towards the opposing fork. The bale carriers 129 are the main contact surface for the baled material and prevent the baled material from passing between the forks 107 as it is loaded into the processing tub 1. A bale spear 131 is also mounted on the cross bar 109 between the two forks 107. As the baled material is positioned on forks 107 and slides toward cross bar 109, the bale spear 131 punctures the baled material to maintain the baled material in position as it is raised into the processing tub 1.

Figure 11:
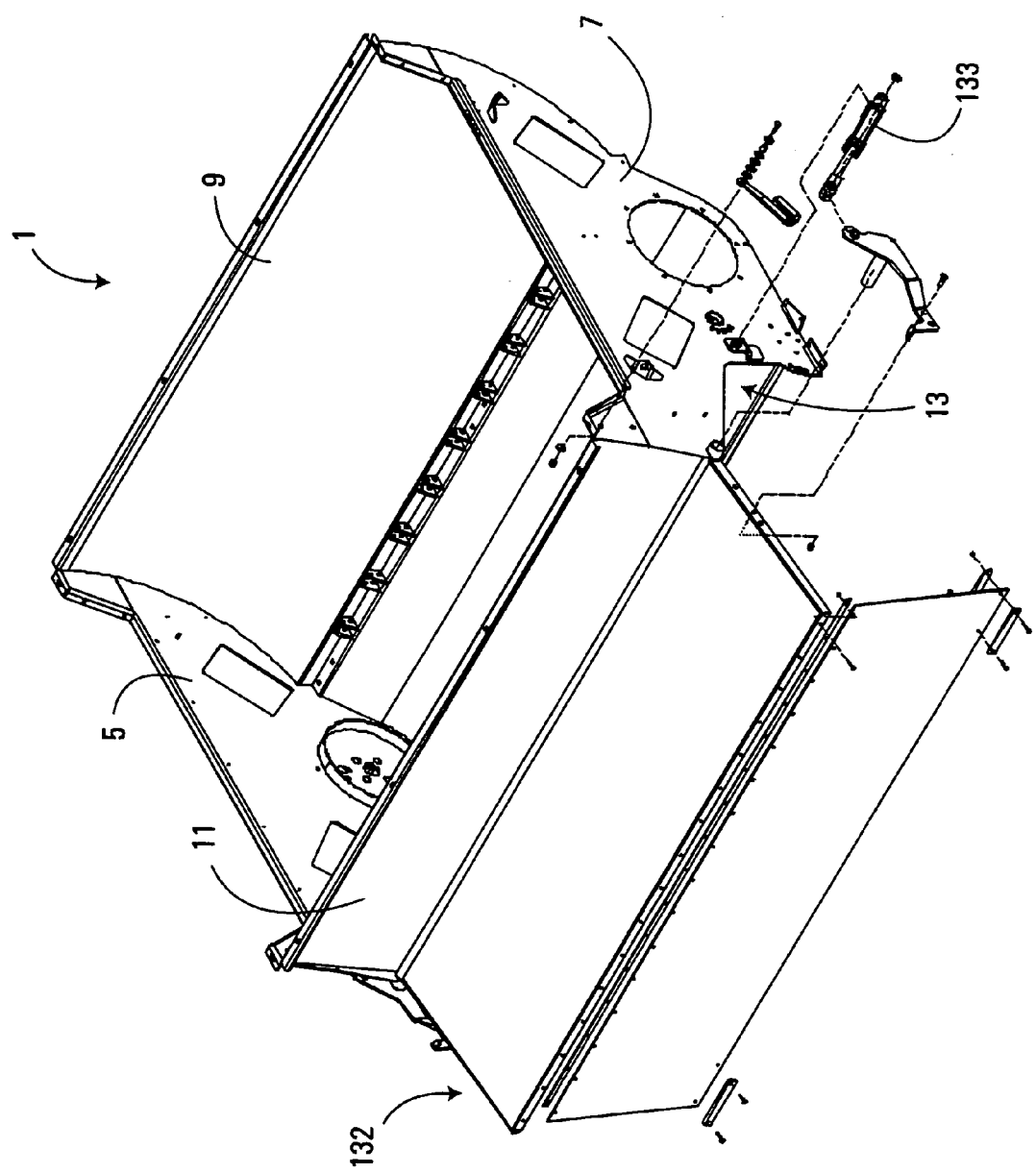
FIG. 11 is an exploded perspective view of the processing tub of a bale processor according to an embodiment of the invention with a discharge door mounted thereto.

As shown in FIG. 11, a discharge door 132 is pivotally attached to side wall 11 above the discharge opening 13. The discharge door 132 is raised and lowered to direct the processed bale material as it is ejected from the discharge opening 13. A hydraulic cylinder 133 is pivotally mounted between the processing tub 1 and the discharge door 132 to raise and lower the discharge door. When the bale processor is in the left-hand discharge arrangement as shown in FIG. 14, the hydraulic cylinder 133 is mounted to end wall 5. When the bale processor is in the right-hand discharge arrangement as shown in FIG. 15, the hydraulic cylinder is mounted on end wall 7.

Figure 12:
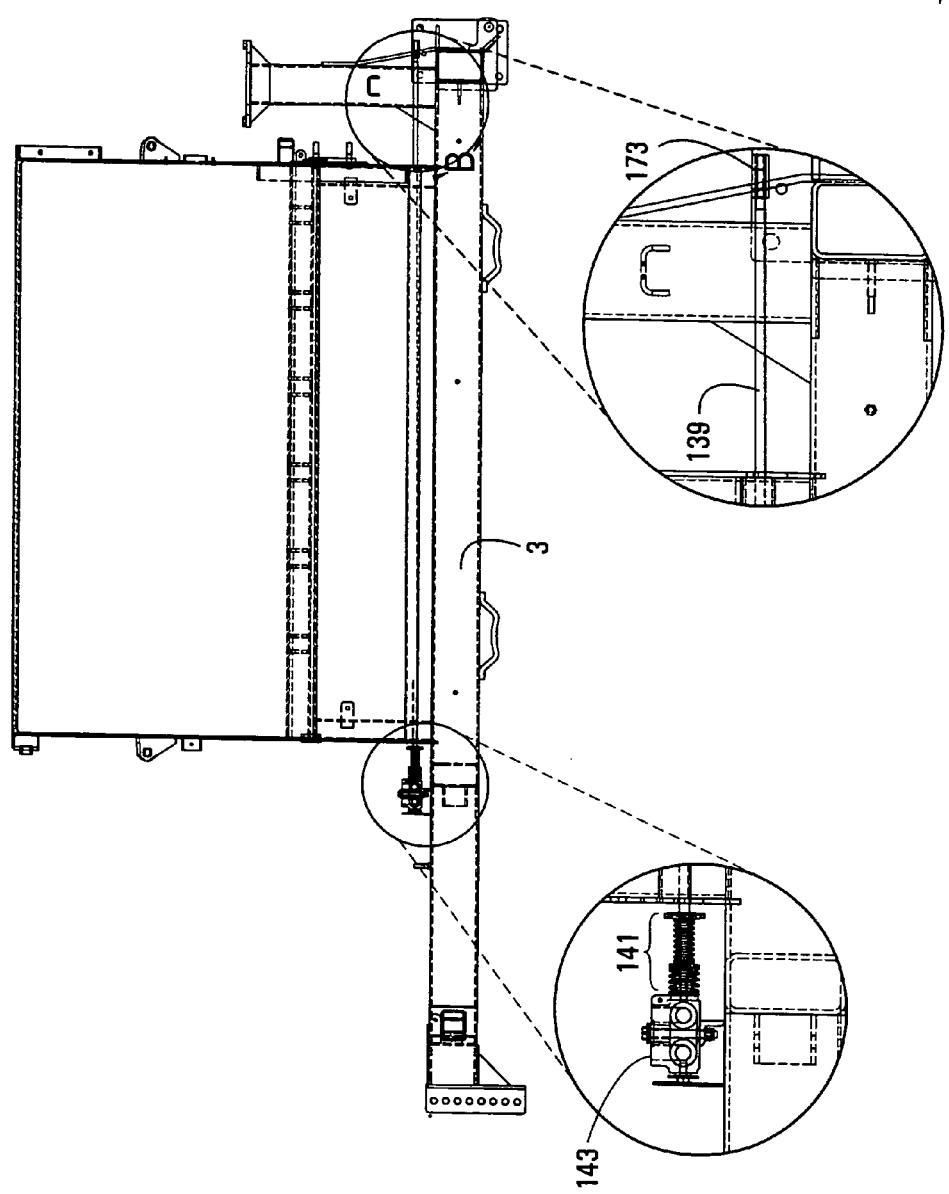
FIG. 12 is a side, cut away view of a bale processor according to an embodiment of the invention showing the hydraulic selector assembly.
Figure 13:
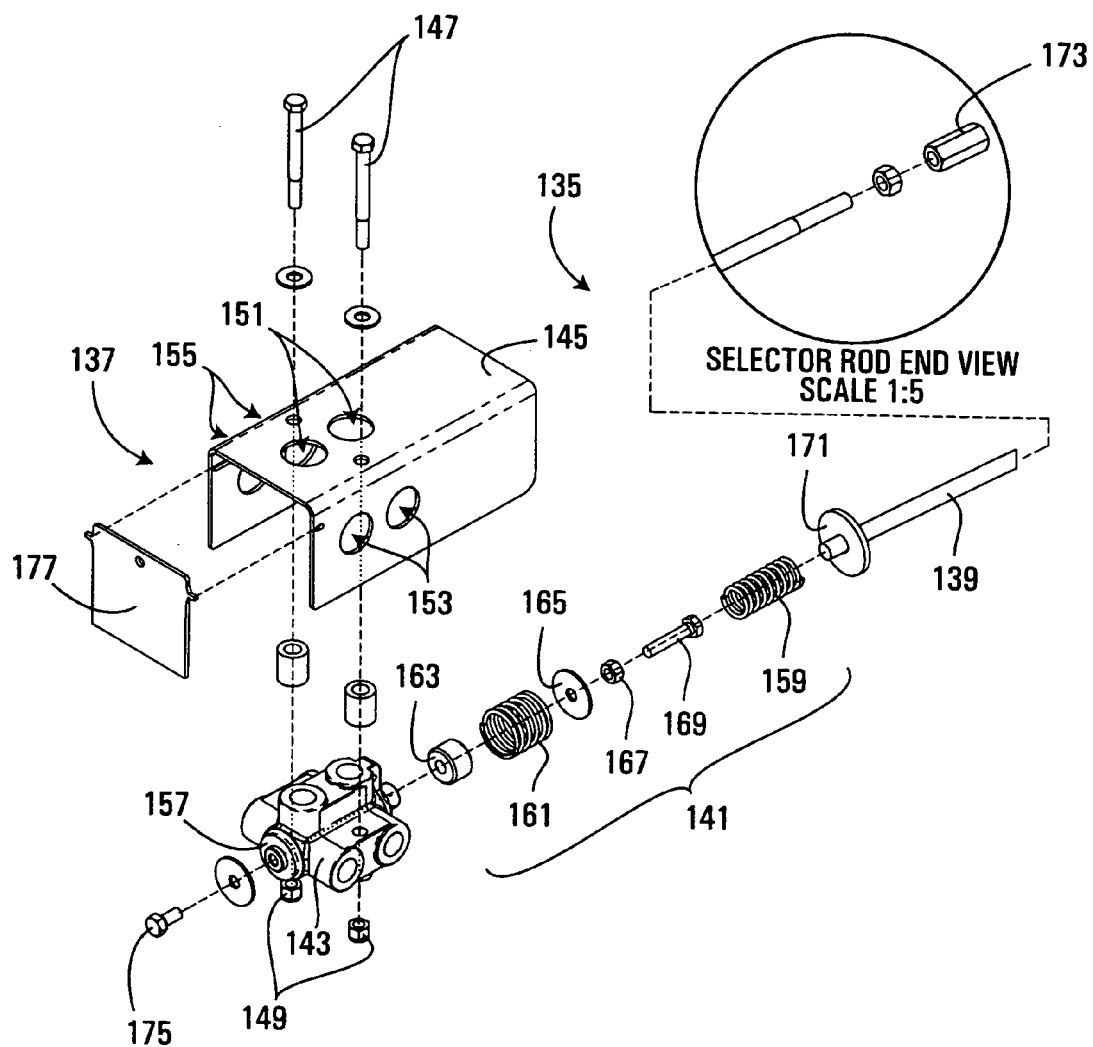
FIG. 13 is an exploded perspective view of a hydraulic selector assembly according to an embodiment of the invention.

As shown in FIGS. 12 and 13, the bale processor has a hydraulic selector assembly 135 comprising a selector valve 137 mounted on the chassis 3 and the front end wall of the processing tub 1, a rod 139 extending from the selector valve 137 to beyond the rear of the chassis 3 and an actuation assembly 141. The selector valve 137 includes a selector valve head 143 mounted within a casing 145 by bolts 147 and nuts 149. The selector valve 137 has inputs 151 positioned on the top thereof and a first and second outputs 153 and 155 positioned on opposing sides. A spool 157 is mounted within the selector valve head 137 and is axially slidable therein between a first position wherein the hydraulic fluid flow in the inputs 151 is directed to the first outputs 153 and a second position wherein the hydraulic fluid flow from the inputs 151 is directed to the second outputs 155.

The actuation assembly 141 moves the spool 157 between the first position and the second position and includes two springs 159 and 161, a spacer 163, a washer 165 and a nut 167 each of which are axially mounted on a bolt 169 which is secured to spool 157. Nut 167 secures the washer 165 and the spacer 163 to the spool 157. Spring 161 has a diameter sufficiently large to be mounted over the spacer 163 and washer 165 has a diameter larger than spring 161 thereby maintaining the spring in position between the washer and the selector valve head 143. The length of spring 161 and spacer 163 are selected such that, when assembled, the spring 161 is slightly compressed thereby exerting a rearward force on washer 165 to maintain the spool 157 in the first position when no forward force is exerted on washer 165.

Spring 159 is positioned between a washer 171 mounted on the front end of rod 139 and washer 165. A portion of rod 139 extends beyond washer 171 to maintain the spring 159 in position. The strength of spring 159 is greater than the strength of spring 161. Accordingly, movement of rod 139 towards the selector valve 137 causes spring 159 to exert a force on washer 165 thereby compressing spring 161 and moving the spool 157 forward within selector valve head 143. Sufficient movement of rod 139 towards the selector valve 137 moves the selector valve to the second position. The selector valve head 143 is designed such that the spool 157 cannot move forward in the selector valve head once it is in the second position.

A gap is provided between the rod 139 and the bolt 169. Accordingly, if rod 139 is moved further towards selector valve 137 once the spool 157 has moved into the second position, spring 159 is compressed without altering the position of other elements of the connection assembly 141. This arrangement allows facilitates adjustment of the system while preventing damage to the spool 157, selector valve head 143 and/or rod 139.

The rod 139 is forced towards the selector valve 137 by the lowering of fork lift 97. As shown in FIG. 12, the rear end of rod 139 extends beyond chassis 3 and is threaded with a nut coupling 173 mounted thereon. The nut coupling 173 is rotated to provide slight adjustments in the length of rod 139.

When fork lift 97 is lowered, the fork lift abuts rod 139 forcing it towards the selector valve 137, thereby moving the spool 157 from the first position to the second position as described above. The front of spool 157 is provided with bolt 175 adapted to abut with a door 177 pivotally mounted to the casing 145 when the spool is moved to the second position, thereby raising the door as an indication that the selector valve 137 is activated. As the fork lift 97 is raised, spring 161 exerts a rearward force on washer 165 moving the spool 157 back to the first position and moving the rod 139 rearwardly.

The hydraulic selector assembly 135 provides the ability to operate the three hydraulic systems of the bale processor (the hydraulic motors 33, the hydraulic cylinders 105 for the fork lift 97 and the hydraulic cylinder 133 for the discharge door 131) with only two hydraulic lines. The first set of hydraulic lines are attached to the hydraulic cylinders 105 to raise and lower the fork lift 97. The second set of hydraulic lines are attached to inputs 151 of the selector valve 137. The first and second outputs 153 and 155 of the selector valve 137 are each connected to one of the other hydraulic systems. Typically, the first outputs 153 are connected to the hydraulic system used most frequently (i.e. hydraulic motors 33). The fork lift 97 is raise and lowered to selectively direct the hydraulic fluid flow in the second set of hydraulic lines between the hydraulic motors 33 and the hydraulic cylinder 133.

It will be understood by those skilled in the art that numerous alterations, modifications and variations to the above embodiments can be made without departing from the invention as claimed.

The invention claimed is:

1. An apparatus for processing baled crop material comprising:
   a. a chassis having a front and back end and a left and right side;
   b. a bale receptacle mounted on the chassis;
   c. a disintegrator mounted in the bale receptacle adapted to disintegrate baled crop material and to discharge processed material out of the bale receptacle;
   d. a fork lift mounted toward the back end of the chassis having a fork lift frame pivotally connected to the chassis and two forks on said fork lift frame extending rearward of the chassis with each fork having a free end distal from said chassis;
   e. a hydraulic cylinder connected between the fork lift frame and the chassis adapted to pivot the fork lift frame between a first position in which said forks are maintained in close proximity to the ground facilitating sliding of the forks under a stationary bale and a second position in which said forks extend above the top of said receptacle;
   f. a bale carrier between the respective forks having a lower profile than said forks when said fork lift frame is in said first position facilitating sliding of the carrier under a square bale on a planer surface, said bale carrier comprising separate bale carrier elements attached toward said free end of the respective forks, said bale carrier elements each having a front section attached toward the free end of its respective fork and tapering inwardly toward the opposing fork, said bale carrier being adapted to engage and support a bale as it is lifted by said fork lift;
   g. wherein said fork lift is adapted to retain said bales on said forks as the fork lift frame is pivoted between said first and second position and to release said bale into said receptacle when said fork lift frame approaches said second position thereby flipping said bale into said bale receptacle;
   h. wherein said bale carrier elements each have a first section attached toward said free end of a respective fork and tapering inwardly toward the opposing fork, a second section extending forwardly between the forks, and a third section tapering outwardly and having an end attached to its respective fork at a position forward from the attachment of said first section; and
   i. wherein the distance between the respective forks and the length of each fork may be adjusted to accommodate different sizes of bales.

2. An apparatus as claimed in claim 1 wherein said bale carrier elements are attached to a bottom surface of the respective forks.

3. An apparatus as claimed in claim 1 wherein the forks are configured so as to accommodate different sizes of bales including large square bales, one or more large round bales or one or more small bales.

4. An apparatus as claimed in claim 1 wherein said fork lift and said receptacle are each adapted to longitudinally accommodate one large square bale or one or more round bales.

5. An apparatus for processing baled crop material comprising:
   a. a chassis having a front and back end and a left and right side;
   b. a bale receptacle mounted on the chassis;
   c. a disintegrator mounted in the bale receptacle adapted to disintegrate baled crop material and to discharge processed material out of the bale receptacle;
   d. a fork lift mounted toward the back end of the chassis having a fork lift frame pivotally connected to the chassis and two forks on said fork lift frame extending rearward of the chassis with each fork having a free end distal from said chassis and wherein the distance between the respective forks and the length of each fork may be adjusted to accommodate different sizes of bales;
   e. a hydraulic cylinder connected between the fork lift frame and the chassis adapted to pivot the fork lift frame between a first position in which said forks are maintained in close proximity to the ground facilitating sliding of the forks under a stationary bale and a second position in which said forks extend above the top of said receptacle;
   f. a bale carrier between the respective forks having a lower profile than said forks when said fork lift frame is in said first position facilitating sliding of the carrier under a square bale on a planer surface, said bale carrier comprising separate bale carrier elements attached toward said free end of the respective forks, said bale carrier elements each having a front section attached toward the free end of its respective fork and tapering inwardly toward the opposing fork, said bale carrier being adapted to engage and support a bale as it is lifted by said fork lift;
   g. wherein said fork lift is adapted to retain said bales on said forks as the fork lift frame is pivoted between said first and second position and to release said bale into said receptacle when said fork lift frame approaches said second position thereby flipping said bale into said bale receptacle; and
   h. wherein said bale carrier elements are attached to a bottom surface of the respective forks, each of said bale carrier elements having a first section attached toward said free end of a respective fork and tapering inwardly toward the opposing fork, a second section extending forwardly between the forks, and a third section tapering outwardly and having an end attached to its respective fork at a position forward from the attachment of said first section.

* * * * *